May 5, 1931.　　　H. H. CROSS ET AL　　　1,804,210
LUBRICANT DEMONSTRATING CAN
Filed Sept. 4, 1928
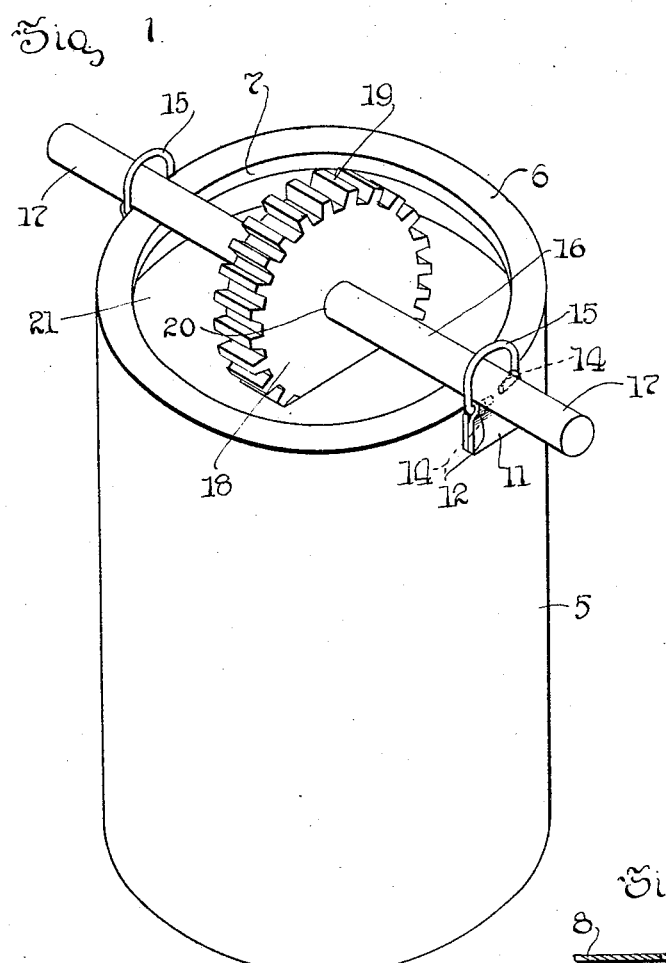
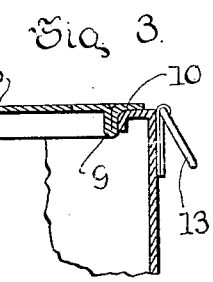
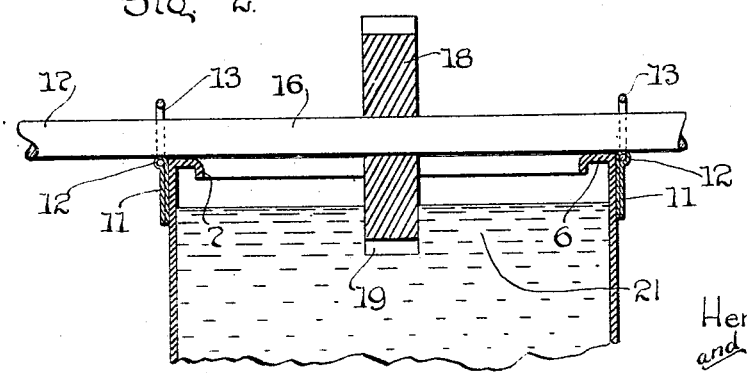
Witness
William R. Kilroy
Inventors
Henry H. Cross
and George S. Sox
By Geo. I. Haight
Att'ys Patented May 5, 1931

1,804,210

UNITED STATES PATENT OFFICE

HENRY H. CROSS AND GEORGE F. FOX, OF CHICAGO, ILLINOIS

LUBRICANT-DEMONSTRATING CAN

Application filed September 4, 1928. Serial No. 303,763.

This invention relates to lubricant demonstrators.

In the sale of lubricants for use in connection with the transmission and similar gears of motor vehicles, there is a great difference in the qualities of lubricants which may be obtained, and it is difficult to distinguish between lubricants of good and poor qualities without actually observing the manner in which the lubricant reacts to different conditions, particularly with respect to changes in temperature and relative to the consistency of the lubricant under such conditions.

Heretofore lubricants for this purpose could be demonstrated only by actual trial in the gearing of vehicles, and under such conditions it was, of course, impossible to determine with any degree of assurance the action of the lubricant with respect to the gears under varying conditions of temperature and the like.

An object of the present invention is to provide a simple arrangement requiring no complicated mechanism, which may be utilized in demonstrating the properties of a lubricant of remaining constantly at the required consistency under varying temperatures, as demonstrated by the provision of a small detachable gear which may be temporarily placed in position to be partially immersed in the lubricant and rotated, whereby the consistency of the lubricant may visually be observed by the prospective purchaser who may satisfy himself that the lubricant will not channel or exhibit other defects considered undesirable in gear lubricant.

Another object of the invention is to provide a demonstrating structure of the character referred to wherein the parts utilized are of the simplest character and so constructed that the same may be distributed to a very large number of sellers of lubricant, either gratis, as an advertising expedient, or at such small cost as to be practically negligible, that is, the receptacle used to form a container for the lubricant may be a small can made of tin, of the type in which the lubricant is sold, if desired, and the gear constructed of cheap material, and the can and gear provided with simple means whereby a pencil, or other suitable element, may be temporarily utilized as a shaft for mounting the gear upon the can, and the gear rotated by spinning the pencil, or other element used as a shaft, the parts being readily detachable and the can closed with a suitable cover.

Other and further objects and advantages of the invention will more fully and clearly appear from the description and claim hereinafter following.

In the drawings forming part of this specification, Figure 1 is a perspective view of a receptacle for a lubricant, showing the gear rotatably mounted and in position to rotate within the lubricant. Figure 2 is a fragmentary diametrical sectional view through the containing vessel and gear, and showing the manner of mounting the same. And Figure 3 is a fragmentary vertical sectional view of the containing vessel with the gear mechanism removed and a cover placed upon the can.

As shown in the drawings, 5 represents a cylindrical body portion, which may be in the form of an ordinary can made of tin, the upper portion of the wall of which is provided with an integral inwardly extending annular web 6, the extremity of which is provided with a down-turned annular flange 7, which co-operates with the usual type of cover indicated at 8, having a cup-shaped portion 9 fitting tightly within the flange 7, and provided with a flange 10 which rests upon the top surface of the annular web 6, thereby providing a tight closure of a well known form. A can of this character is of a usual form and may be purchased in the open market very cheaply.

In carrying out the invention, the can at diametrically opposite sides is provided with looped straps 11—11, the ends of each of which are soldered to the adjacent wall of the can body in such position that the loop 12 projects slightly above the upper extremity of the web 6. Pivotally mounted in each of the loops 12—12 are ears 13—13. Each of the ears is preferably made up of wire having end portions 14, which fit within the loop, and a substantially circular portion 15 which, in one position, projects upwardly above the annular web 6 of the can, the circular portion of each of the ears 13—13 being of sufficient size to detachably accommodate the ends of a shaft 16, which may be in the form of a pencil, or other element of like and inexpensive construction, the member 16 being of such length as to have the ends 17—17 thereof project outwardly beyond the opposite sides of the can, whereby one of said ends, or both, may be grasped by the fingers of the operator and rotated.

Detachably mounted between the ends of the shaft 16, is a gear 18, which may be cut out from wood or other fibrous material, or any other suitable material desired, said gear being provided with teeth 19 along its circumferential periphery. The gear 18 has a central opening 20, through which the shaft 16 projects, and the opening 20 may be of such size as to cause sufficient frictional engagement between the walls of the aperture 20 and the shaft 16 as to cause rotation of the gear when the shaft 16 is rotated. The gear is so positioned as to project partially into the lubricant, indicated at 21, so that when the shaft 16 is rotated the gear teeth and part of the gear will pass through the lubricant in the can.

In use of the invention it will be appreciated that the can may be shipped with the lubricant contained therein, if desired, and the gear wheel sent to the user separately through the mails. Upon receipt of the can and gear, the cover 8 may be removed and the can placed in any suitable location, the gear 18 held vertically and the shaft, which may be a pencil, inserted first through one ear and through the aperture 20 in the gear 18, and then through the other ear upon the can, thereby completely assembling at very little expense, an efficient demonstrating device for the lubricant; or, if desired, the can without lubricant, and with the shaft 16 and gear 18 contained therein, may be distributed to the users, and the can subsequently filled with lubricant and the gear and shaft placed in position as above described. In any event when the shaft and gear are in position, the gear may be rotated in the lubricant by grasping the shaft 16 and turning the same, which will clearly demonstrate the action of the lubricant with respect to the gear, and should any channeling occur in cold weather it may be readily observed, and in hot weather if the consistency of the lubricant appears to be too thin, this also readily may be observed. In addition, many other properties which characterize good and poor quality lubricants may be observed, since the lubricant is viewed under conditions approximating actual use. Disassembling of the device may be easily accomplished by withdrawing the shaft 16 from the can and the top placed thereon to protect the lubricant, as desired.

It also will be appreciated that suitable advertising matter may be placed upon the can, and the demonstrating device utilized only in connection with the lubricant of one certain manufacturer, and hence a device, in conjunction with the particular lubricant, will serve as an advertising medium of great value.

While we have herein shown and described what we now consider the proper manner of carrying out our invention, the same is merely illustrative and we contemplate all changes and modifications that come within the scope of the claim appended hereto.

We claim:

In a structure of the character described, the combination with a receptacle having an opening at one end and adapted to contain lubricant, a pair of hinged loop members mounted on opposite sides of the receptacle adjacent the end and adapted to be swung to a position above the end of the receptacle to form bearings for a shaft inserted loosely through said loop members and projecting beyond the same, whereby said shaft may be rotated by manipulating the ends thereof with the fingers; and a gear mounted on said shaft between said bearings and detachable when said shaft is removed, said gear being rotatable with said shaft, supported by said shaft in position to project through the opening and into the lubricant in said container.

In witness that we claim the foregoing we have hereunto subscribed our names this 31st day of August, 1928.

HENRY H. CROSS.
GEORGE F. FOX.